United States Patent [19]
Ferguson et al.

[11] Patent Number: 5,716,709
[45] Date of Patent: Feb. 10, 1998

[54] MULTILAYERED NANOSTRUCTURES COMPRISING ALTERNATING ORGANIC AND INORGANIC IONIC LAYERS

[75] Inventors: Gregory S. Ferguson, Bethlehem; Elaine R. Kleinfeld, Durham, both of Pa.

[73] Assignee: Competitive Technologies, Inc., Bethlehem, Pa.

[21] Appl. No.: 274,920

[22] Filed: Jul. 14, 1994

[51] Int. Cl.$^6$ ............................. B32B 7/04; B32B 9/04; B32B 13/04; B32B 19/00
[52] U.S. Cl. ................. 428/420; 428/446; 428/448; 428/454; 428/457; 428/688
[58] Field of Search ........................ 428/420, 457, 428/469, 446, 448, 454, 688, 923, 924; 156/272.2, 278

[56] References Cited

U.S. PATENT DOCUMENTS

| | | |
|---|---|---|
| 4,539,061 | 9/1985 | Sagiv ............................ 156/278 |
| 5,208,111 | 5/1993 | Decher et al. .................... 428/420 |

OTHER PUBLICATIONS

R.K. Iler "Multilayers of Colloidal Particles", *Journal of Colloid and Interface Science* 21, 569–594 (1966).
Gaines, Jr., George L. "Deposition of Colloidal Particels in Monolayers and Multilayers", Thin Film Solids, 99 (1983) 243–248.
S. Evans, A. Ulman, K. Goppert–Berarducci, and L. Gerenser, "Self–Assembled Multilayers of w–Mercaptoalkanoic Acids: Selective Ionic Interactions", J. Am. Chem. Soc. 1991, 113, 5866–5868.
H. Lee, L. Kepley, H. Hong, and T. Mallouk, "Inorganic Analogues of Langmuir–Blodgett Films: Adsorption of Ordered Zirconium 1,10–Decanebisphosphonate Multilayers on Silicon Surfaces", J. Am. Chem. Soc. 1988, 110, 618–620.
G. Ozim, "Nanochemistry: Synthesis on Diminishing Dimensions", Advanced Materials, 4 No. 10 (1992) pp. 612–647.
N. Tillman, A. Ullman, and T. Penner, "Formation of Multilayers by Self–Assembly", Langmuir 1989, 5, 101–111.
Y. Lvov, H. Haas, G. Decher, H. Mohwald, and A. Kalachev, "Assembly of Polyelectrolyte Molecular Films onto Plasma–Treated Glass", Phys. Chem. 1993, 97, 12835–12841.
G. Decher, Y. Lvov, and J. Schmitt, "Proof of Multilayer Structural Organization in Self–Assembled Polycation–Polyanion Molecular Films", Thin Solid Films, 244 (1994) 772–777.
Y. Lvov, F. Essler, and G. Decher, "Combination of Polycation/Polyanion Self–Assembly and Langmuir–Blodgett Transfer for the Construction of Superlattice Films", J. Phys. Chem. 1993, 97, 13773–13777.
J. Cheung, A. Fou, and M. Rubner, "Molecular Self–Assembly of Conducting Polymers", Thin Solid Films, 244 (1994) 985–989.
G. Cao, H. Hong, and T. Mallouk, "Layered Metal Phosphates and Phosphonates: From Crystals to Monolayers", Acc. Chem. Res. 1992, 25, 420–427.
Schmitt, J.; Grunewald, T.; Decher, G.; Pershan, P.S.; Kjaer, K.; Losche, M.; "Internal Structure of Layer–by–Layer Adsorbed Polyelectrolite Films: A Neutron and X–ray Reflectivity Study" *Macromolecules*, 1993, 26, 7058–7063.

*Primary Examiner*—Paul J. Thibodeau
*Assistant Examiner*—Stephen Sand
*Attorney, Agent, or Firm*—Michael R. Novack

[57] ABSTRACT

A two-step adsorption process for producing ordered organic/inorganic multilayer structures is provided. Multilayered films are formed on metallic and nonmetallic substrates by alternate adsorption of a cationic polyelectrolyte and anionic sheets of a silicate clay. The two-step adsorption process is not only fast but allows also for preparation of multilayer elements of thicknesses greater than about 2200 Angstroms on silicon, and greater than about 1500 Angstroms on gold, silver, and copper.

22 Claims, 6 Drawing Sheets

MULTILAYERED NANOSTRUCTURES COMPRISING ALTERNATING ORGANIC AND INORGANIC IONIC LAYERS

BACKGROUND OF THE INVENTION (1). Field of the Invention

This invention relates to a multilayer element which comprises an ordered alternating arrangement(ABABAB ...) of organic and inorganic layers and to a multilayered structure which comprises such an element supported by a substrate. Further, the invention relates to a step-wise adsorption process for the manufacture of such a multilayer element and multilayered structure.

(2). Description of the Prior Art

The production of ultrathin films and multilayered products has long been known. The Langmuir-Blodgett ("LB") method produces such layered products by the sequential transfer of monolayers of organic material from a water surface to a solid substrate. Although the LB process can provide well-ordered, densely packed mono-and multi-layered structures useful for many applications, e.g., non-linear optics, x-ray, and microelectronics, these products and their use are attendant with certain disadvantages. The layers in the ultrathin layered products of LB are mechanically unstable, being held together primarily by van der Waals forces. Also, the products that can be produced by the LB method are somewhat limited because the organic material for building up the layers must be spreadable on the water surface. Further, these products find somewhat limited utility as the process only allows small substrates to be coated.

Spontaneous self-assembly (SA) of molecular adsorbates onto certain solid substrates can also provide densely packed monolayers, and this technique has been extended in recent past to the formation of multilayers in selected systems. Examples include Guang Cao, Hun-Gi Hong, and Thomas E. Mallouk, *Acc. Chem. Res.* 25, 420 (1992), "Layered Metal Phosphates and Phosphonates: From Crystals to Monolayers;" N. Tillman, A. Ullman, T. L. Penner, *Langmuir*, 5, 101 (1989); H. Lee, L. J. Kepley, H.-G. Hong, Thomas E. Mallouk, *J. Am. Chem. Soc.* 110, 618 (1988); S. D. Evans, A. Ulman, K. E. Goppert-Berarducci, L. J. Gerenser, *J. Am. Chem. Soc.* 11, 5866 (1991). The presence of covalent bonds or ionic attraction between layers in these structures provides additional stability in multilayered structures not seen in those from the LB system; however, in many SA systems, adsorption of ordered multilayers has proven difficult.

U.S. Pat. No. 5,208,111, which issued on May 4, 1993, discloses one- or multilayered elements applied to a support or substrate. The support in this product is first modified so that its surface is provided with ions or ionizable compounds of the same charge. Then, one or more layers of organic materials are applied to the support, each such a layer containing ions of the same charge but next adjacent layers being of an opposite charge. The first such a layer applied to the support has ions of opposite charge to the ions on the support's modified surface. The individual layers are disclosed to be produced by application of a solution of the organic material in a suitable solvent, e.g., water or a water and a water-miscible nonionic organic solvent, such resulting in physisorption (salt formation). A problem with the multilayered elements disclosed in this patent, however, is that such are not ordered. The invention disclosed is believed also to require flat substrates that have been pre-treated for adsorption.

Further, there is disclosed a structure comprising ultrathin organic films in "Assembly of Polyelectrolyte Molecular Films onto Plasma-Treated Glass," *J. Phys. Chem.* 1993,97, 12835–12841. One of the investigators disclosed in that article is named as a coinventor in U.S. Pat. No. 5,208,111. This article discloses a self assembly technique for constructing heterostructure films. Such multilayered assemblies are obtained by consecutive alternating adsorption of anionic and cationic polyelectrolytes from aqueous solution onto a charged substrate. The charged substrate is a glass substrate which has been treated by low temperature plasma (glow discharge) to build up a surface charge density required for the self assembly process. According to the investigators, the thickness of the multilayered film structure increases linearly with the number of layers. Further, it is disclosed that the thickness of each layer and the total thickness of the layered structure can be adjusted precisely by changing the ionic strength of the solution from which the polyions are adsorbed. According to the investigators the combination of methane plasma treatment and polyelectrolyte assembly opens a new approach for constructing inorganic/organic nanocomposite films. Nevertheless, the article does not disclose any inorganic/organic films. Also, there is no disclosure of any order within the adsorbed films.

Other technologies for the formation of multilayered structures include vacuum evaporation, sputtering, chemical vapor deposition, and atomic layer epitaxy. These methods are costly, however, in that they require sophisticated instrumentation. Further, using these methods it is difficult to incorporate intact complex molecules of interest.

Accordingly, there is still a need for multilayer elements or structures having a support on which are deposited a plurality of ultrathin layers of material not having the problems now found with multilayer structures, and their method of manufacture.

SUMMARY OF THE INVENTION

It is an object of this invention to provide multilayer elements and structures comprising a substrate on which ultrathin layers of material are deposited not having the problems of the prior art.

It is a further object of the invention to provide multilayer elements and structures which comprise ordered films or layers of material.

It is another object of the invention to provide a relatively simple stepwise adsorption process for the preparation of ordered multilayer structures.

Another object of the invention is to provide multilayer structures wherein an organic cationic precursor is adsorbed from aqueous solution to provide a layer of organic material and an inorganic precursor is absorbed from an aqueous dispersion as individual sheets to provide a layer of inorganic material.

A further object of the invention is to provide a method for the controlled stepwise formation of multilayer elements or structures on various substrates which comprises the sequential adsorption of a layer of cationic polyelectrolyte and individual sheets of the silicate mineral hectorite.

Another object of the invention is to provide a multilayer structure which is prepared by sequential adsorption of layers of organic/inorganic materials on substrates, the multilayers being sufficiently ordered to diffract x-rays.

It is still another object of the invention to provide multilayer structures wherein one or both components has a high aspect ratio, i.e., ratio of lateral dimensions to the vertical one, compared to components known heretofore in multilayered structures.

An even further object of the invention is to provide a multilayered structure wherein the large lateral extent of one or both components allows each such a layer to cover any packing defects in the underlying layer, thus preserving structural order in the growing multilayer element or structure.

The invention relates, in its broadest aspects, in the more preferred embodiment, to multilayer structures which comprise:

(a). a solid substrate or support having a surface on which can be adsorbed a cationic organic material from aqueous solution;

(b). a layer of a cationic organic material adsorbed on and supported by the substrate from an aqueous solution; and (c). a layer of inorganic material supported by the layer of organic material and adsorbed thereon from an aqueous dispersion, said inorganic material bearing a negative charge so as to be capable of undergoing an ion exchange reaction with the cationic organic material.

Further, the invention relates to the method of manufacture of layered structures which comprises the sequential adsorption of alternating layers of organic and inorganic materials, e.g., ABCBABCBAB, where A and C are different cationic polyelectrolytes and B is a mineral, such materials being capable of rapid adsorption from aqueous solutions by ion-exchange mechanism. Other possible sequences can, of course, be thought of by those in the art.

In particular, the invention relates to a multilayer structure (ABAB...) wherein A is a layer of a polyelectrolyte and B is individual sheets of the silicate mineral hectorite.

A key advantage of the invention is that multilayer structures are provided which have a very high degree of coverage of a substrate. This high degree of coverage provides structures that will, in some cases, be found useful as barriers to diffusion of species (including molecules, ions, atoms and electrons) to and from the substrate.

Also of advantage, according to one aspect of the invention, there is provided a method for the building of ordered, alternating organic/inorganic ultrathin layered structures which allows for systematic control over both structure and individual layer thickness.

It is advantageous that the layers of a multilayer structure according to the invention are not only ordered but also that the film is of an adjustable substantially homogenous thickness.

A further advantage of the invention is that multilayer films of great thickness can be provided, e.g., as many as 134 individual adsorptions (i.e. 67 cycles) on silicon, forming structures greater than about 2200 Angstroms in thickness, as will later be more fully understood. This thickness, however, should not be considered as an upper limit; the cycles disclosed herein could, in principle, be performed indefinitely. The multilayer elements of the invention maintain structural order, as evidenced by x-ray diffraction, even in multilayer structures having a thickness greater than about 2000 Å. Quite advantageously, multilayer films formed by 60 adsorption cycles, greater than about 2000 Angstroms in thickness, could be formed in under two hours.

Another advantage is that the method of preparation of multilayer structures according to the invention can be performed in a simple manner and more rapidly than other adsorption procedures now used for building multilayer structures.

The ultrathin layers and multilayer structures of the invention will be found useful in many, and various, applications in industrial technology, for example, as insulating and protective coatings for packaging of microelectronics; dielectric layers to separate films of metal and/or semiconductors in electronic devices; general protection of metal and semiconductor surfaces from corrosion; membranes for construction of fuel and/or solar cells and solid-state batteries; membranes for molecular separation and chiral resolutions; protective coatings in packaging of food; coatings for reduction of friction and wear at surfaces; and primer layers to enhance wettability of a substrate and adhesion of subsequently added coatings.

The sequential nature of the process for preparation of the multilayer structures of the invention, quite advantageously, allows well-defined placement of the organic/inorganic layers in an ordered arrangement. This control over order will be found useful, for example, in preparing nonlinear optics which are useful, for example, in increasing the efficiency of optical data storage and retrieval; preparing diffractive optical elements for x-rays; preparing multilayers containing magnetic materials for magnetic information storage; preparing sensors and modified electrodes; and preparing multilayers containing fluorescent or phosphorescent molecules for optical information storage. In particular for electronic and optical purposes, it is necessary to produce thin, nearly defect-free multilayer structures whose layers have a high degree of order and an adjustable, substantially homogenous over all thickness, as can be prepared according to the invention disclosed herein. This high degree of order must also be maintained where the structure contains a multiple of layers.

It is a further advantage of the multilayer structures according to the invention that the layers have a unique combination of an ordered structure in the direction perpendicular to the substrate surface and 1- to 2- nm lattice spacings, not seen in other films formed by adsorption from solution. This combination of features allows the precise control of structure of solid films at the molecular level. This structure, in turn, determines properties of interest (optical, electronic, etc.). Further, due to the crystallinity of the silicate sheets and the tendency of these sheets to align in a parallel orientation, the layered structures of the invention possess a degree of structural order that has not been observed in multilayer structures produced by self-assembly procedures.

BRIEF DESCRIPTION OF THE DRAWINGS

Other objects, features and advantages of the present invention will become more apparent from the following description of the invention when taken in conjunction with the accompanying drawings wherein.

DETAILED DESCRIPTION OF THE INVENTION AND THE PREFERRED EMBODIMENTS THEREOF

Figure 1:
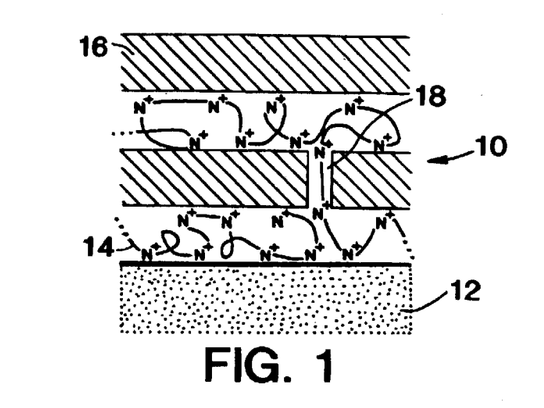
FIG. 1 shows in cross-section a multilayer structure in accordance with the invention wherein a substrate is provided with a multilayer element comprising alternating layers (ABAB...) of organic and inorganic materials, the individual layers shown and the substrate each being of greatly exaggerated thickness for sake of clarity in describing the invention.

Turning now to FIG. 1 of the drawing, there is shown therein a multilayer structure 10 according to the invention. The multilayer structure 10 comprises a substrate or support member 12 and a multilayer element supported thereby comprising alternating ultrathin layers of an organic material 14 and an inorganic material 16, such layers being deposited on the surface of the substrate and upon the surface of each other as shown. Although only two layers are shown deposited on substrate 12 and upon one another in FIG. 1, the multilayer structure 10 can comprise any number of such alternating layers (ABAB ...) to provide a structure of the desired thickness, as will be appreciated by reference to FIG. 2 more fully described hereafter.

A substrate 12 which will be found useful in the practice of the invention is one on which cationic compounds can be adsorbed directly or, in some cases, with an adhesion promoter or precoating thereon. Nevertheless, various substrates can be used in the practice of the invention, e.g. crystalline substrates such as a (100)-oriented single-crystalline silicon wafer bearing a native oxide. Such a substrate can be cut according to known techniques into various sizes as desired, e.g., small pieces about 1 cm by about 2 cm. This substrate is then cleaned according to known procedures to practitioners in the field, e.g., with a 2:1 (v/v) solution of conc. $H_2SO_4/30\%H_2O_2$ to provide a hydroxylated surface. The substrate is then thoroughly rinsed with purified water. Those in the art will appreciate, however, that other crystalline faces of silicon can also be used. Moreover, other oxides will also be found useful as substrates.

Other inorganic materials, however, can also be used as the substrate, e.g., in the form of single crystals or amorphous materials such as are known to those skilled in the LB technology. These include any surface onto which a cationic material can be adsorbed, e.g., those substrate materials which have a hydroxylated surface or are capable of having their surfaces modified to provide ions on the surface. The manner of modifying such a substrate surface will depend largely upon the chemical nature of the substrate material. Nevertheless, such a modification can readily be accomplished by those skilled in the chemical art and working in the area of multilayer thin films.

The substrate used need not, however, have a hydroxylated surface, or a surface that bears ions. For example metal substrates such as gold, silver, and copper can also be used with no pretreatment. These metals may be coated onto a substrate such as a silicon wafer, if desired. As is usual, the silicon wafer or other substrate on which the metal is to be deposited may be first treated with a suitable adhesion promoter. Where the substrate used in the practice of the invention is gold, it may be desirable, in at least some cases, that the gold surface be first coated with an ω-mercaptoalkylammonium compound to promote adsorption of the first silicate layer. Such multilayer structures will allow electrodes to be prepared with complex but controllable barrier layers, these multilayered structures being useful as electrical insulators, diffusional barriers, or mediators for electron transfer. Organic substrates can also be used in some applications.

Various materials can be used as the layer 14 of organic material, e.g., a polymer having a multiplicity of ionic or ionizable functional groups of the same charge. A polymer which will be found useful in the practice of the invention is a cationic material, e.g. a polyelectrolyte. These organic materials may carry functional groups all having the same charge (i.e., either cations or groups which can be ionized to cations or anions or groups which can be ionized to anions). The ions in such a material are combined with counterions for charge neutralization. The preferred counterions for this purpose are the monovalent ones, and of these the simple ones such as the halides, perchlorate or acetate are more preferred. The polyelectrolyte can be, for example, poly (diallyldimethylammonium chloride) ("PDDA"), poly (N-methyl-4-vinylpyridinium bromide), or poly(D-lysine hydrobromide). Nevertheless, the organic material can have both negative and positive charges, as long as one is in excess.

It will be appreciated by those in the art that, since the layers in the multilayered structures of the invention are held together by Coulombic interaction, rather than specific covalent bonds, other polyelectrolytes than those above-mentioned may be used in the practice of the invention as the organic layer. Neutral polymers capable of co-ordinating cations may also, in some cases, be used. The cationic material need not necessarily be a polymeric material. A monomeric, cationic material, e.g., metalloporphyrin, can be used, instead. Where this cationic material has been used, however, we have discovered that the thickness added per silicate adsorption is about half that expected.

The layer 16 can be of various inorganic materials, e.g., various clays and layered minerals. One inorganic material that will be found particularly useful in the multilayer structure 10 is a silicate clay which when dispersed in water bears a negative charge, which in the precursor is balanced by interlamellar sodium cations. Thus, the anionic inorganic material is capable of undergoing ion exchange reactions with cationic materials. One such a silicate is a synthetic hectorite, a mica-type layered silicate available under the trade designation "Laponite RD" from Laporte Industries Ltd. of Luton, England (UK). When this silicate mineral is stirred in water, it exfoliates into crystalline, quasi-two-dimensional sheets that are about 9.6 Å thick. These sheets can be of various diameters, as desired. Sheets approximately 25–35 nm in diameter have been used in the practice of the invention.

The layers of the multilayer element according to the invention can be adsorbed onto the substrate and upon each other using various solvents, depending somewhat upon the organic/inorganic materials being adsorbed. Water is of somewhat an advantage as it can be used as the solvent alone for both the organic material, i.e., a polyelectrolyte solution, and in forming the silicate dispersion. Nevertheless, mixed solvents can also be used, e.g. water-acetone, water-ethanol, and water-THF, in the case of the silicate dispersion; water-acetone and water-ethanol, in the case of the polymer solution. The concentrations of the polymer solution and silicate dispersion can be varied somewhat, as desired. The optimum concentration in any particular case can be readily determined by those skilled in the art.

The invention may be more fully understood by reference to a specific example with particular reference to the accompanying drawings. Nevertheless, it is to be understood at the outset that it is contemplated that the invention may be varied in specific detail from that illustrated and described herein while still achieving the desirable characteristics and features of the invention. Accordingly, the description of the invention which follows is intended to be an enabling disclosure directed to those persons skilled in the art to which the invention pertains, and is not to be understood as being restrictive.

EXAMPLE NO. 1

Figure 2:
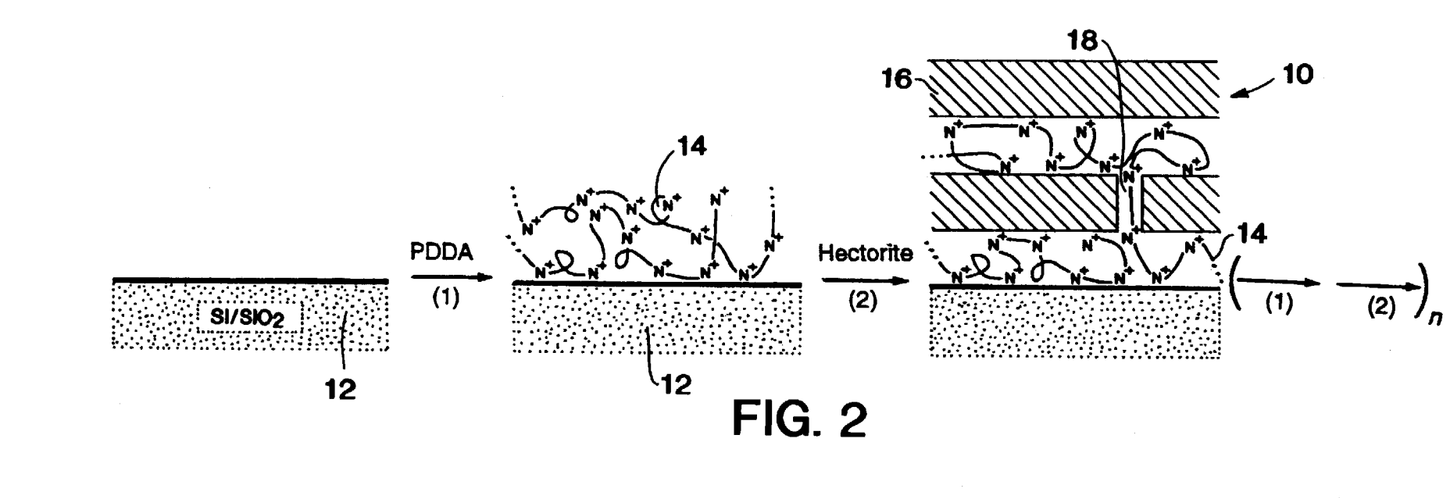
FIG. 2 shows diagrammatically the stepwise procedure for the manufacture of a multilayer structure as shown in FIG. 1.

In general, and as is shown in FIG. 2, the substrate 12, a (100)-oriented single-crystalline silicon wafer bearing a native oxide and cleaned by known procedure is provided on its top surface with a layer of PDDA (step 1). The top layer of the PDDA is then provided with a layer of the silicate mineral hectorite (step 2). Steps 1 and 2 are then repeated a number of times, if desired, to provide a multilayer structure 10 comprising a multilayer element of the desired number of alternating layers (14 16, 14 16, . . . ). Thus, a multilayer structure 10 according to the invention is prepared by the sequential adsorption of the polyelectrolyte polydiallyldimethylammonium chloride and exfoliated sheets of synthetic hectorite. The substrate used measured about 1 cm×about 2 cm. Nevertheless, in principle, a multilayer element or structure can be advantageously adsorbed on a substrate of an indefinitely large area, and within very short periods of time—seconds to minutes for each adsorption cycle.

The PDDA layers 14 are obtained by adsorption from an aqueous solution of the polymer applied to the surface of the substrate 12 and to the surface of the inorganic layer, as shown in the drawings. Thus, a 5% (w/w) aqueous solution of PDDA is first prepared in known manner. Several drops of this solution is then allowed to drip onto the hydroxylated surface of the silicon wafer substrate. When the polyelectrolyte PDDA is used in the practice of the invention, it has been found that the molecules thereof bind to the substrate and to the inorganic layer in a manner that allows coverage (healing) of any underlying defects. Thus, there is prevented a loss of potential binding sites in the layer below. Defects are not permanent because they can be covered over in subsequent cycles.

The inorganic layers 16 are obtained by adsorption from an aqueous dispersion thereof applied to the surface of the PDDA layer. Thus, there is prepared a 0.2%(w/w) aqueous dispersion of the hectorite. Several drops of this dispersion is then allowed to drip onto the PDDA surface.

The adsorption, in each case, is discovered to have reached a satisfactory extent after only about 5 seconds. Between each of the applications, and after the adsorption has reached a satisfactory extent, the residual amounts of organic material or inorganic material, as the case may be, that are not bonded to a next adjacent layer are removed from that layer by rinsing with purified water (Millipore Milli-Q, 16–17 Ωcm). Following rinsing, each of the respective layers are blown dry with nitrogen according to conventional manner. Although the adsorption in this case for each layer has been found to reach a satisfactory extent after about only 5 seconds, the rinsing need not necessarily be done at that time. Moreover, other times may be required for the adsorption of other organic and inorganic materials to reach a satisfactory extent.

An x-ray photoelectron survey spectrum of a silicon substrate that had been treated with PDDA, then hectorite, then PDDA, as above described, confirmed the presence of the elements Si, O, Mg, C, N, and Cl in the silicate and the polymer layers. This is in accordance with the approximate molecular formulas of Laponite RD ($Si_8[Mg_{5.5}Li_{0.4}H_{4.0}O_{24.0}]^{0.7-}Na_{0.7}^{0.7+}$) reported by J. D. F. Ramsay, *J. Colloid Interfac. Sci.* 109, 441 (1986) and of PDDA. The low expected concentration of lithium in the film and the low sensitivity factor of the lithium 1 s orbital explain the absence of a Li peak. The survey spectrum was obtained on a Scienta ESCA-300 spectrometer available commercially from Scienta Instruments AB of Uppsala, Sweden using AlKα radiation. In addition to the elements named earlier, this spectrum revealed a trace amount of oxidized sulfur on the sample(S 2s,232.0 eV), most likely due to the cleaning procedure used for the silicon wafer. See W. Kern, *J. Electrochem. Soc.* 137,1887 (1990).

By repetition of this two-step adsorption cycle, multilayer elements of various thicknesses can be obtained. A multilayer element having an overall thickness greater than about 2000 Å was prepared in under 2 hours. Each adsorption cycle, it was discovered, results in a high degree of coverage of the substrate. This results, apparently, from the fact that defects in one layer can be covered in the subsequent step. In this sense, the procedure of preparing multilayer structures in accordance with the invention results in a "self healing" process.

Layers of the organic material may be provided of different thicknesses by varying the molecular weight of the polymeric material, the concentration thereof in the solvent and the adsorption time. Thus, the lower the molecular weight of the polymer, the smaller will be the thickness of the layer that can be produced. The same is true with respect to the concentration. Smaller concentrations result in layers of a lesser thickness than do higher concentrations. It has been possible to control the growth in thickness per absorption cycle from between about 7 to about 48 Angstroms by varying the concentration of the polymer solution.

The growth in thickness of a multilayer element according to the invention was monitored by optical ellipsometry (Rudolph AutoEL III) at a wavelength of 632.8 nm as a function of the number of adsorption cycles. In a typical preparation involving 5 cycles, it was found that approximately 1.1 nm of polymer (P) and 2.1 nm of silicate (H) were adsorbed each cycle, as shown by the graph in FIG. 3.

Figure 4:
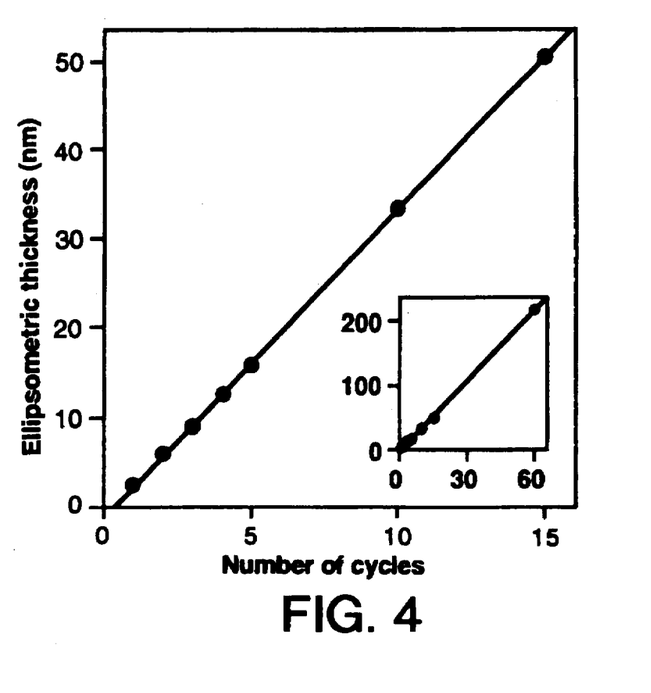
FIG. 4 is a graph showing the ellipsometric thickness of a multilayer structure according to the invention for 15 and 60(inset) complete PDDA/hectorite cycles.

The linear increase in the thickness of the multilayer element supported by the substrate 12, as a function of the number of adsorption cycles, is shown in FIG. 4. As will be seen from FIG. 4, the average thickness adsorbed per cycle, as determined ellipsometrically (assuming a refractive index of 1.5) increased slightly as the number of cycles increased, from roughly 3.2 nm over 5 cycles to roughly 3.6 nm over 60 cycles. The native oxide on silicon is not included in the reported thickness. The straight line shown in FIG. 4 is believed to best fit the data.

Figure 3:
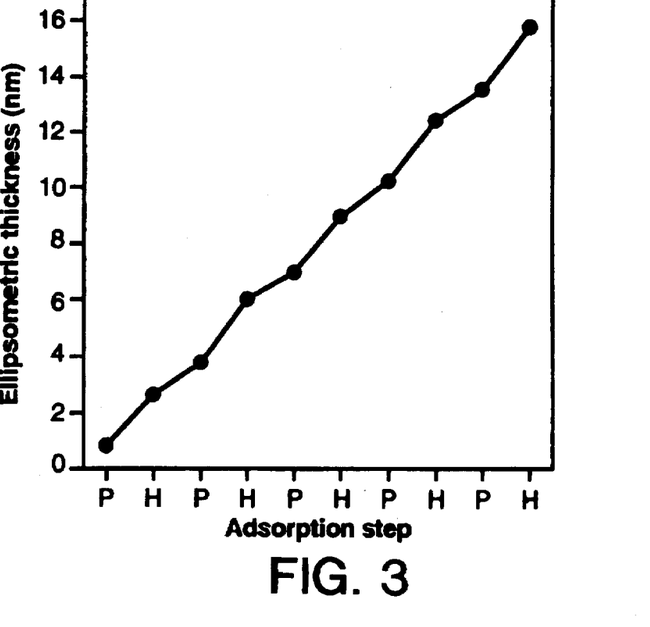
FIG. 3 is a graph showing the ellipsometric thickness of a multilayer structure according to the invention on a single-crystalline silicon substrate, as a function of the number of adsorption steps "P" (polymer) and "H" (hectorite).

The data shown in FIGS. 3, 4 are averages over three points on each of two samples treated side-by-side, with the exception of the point at 60 cycles. This is an average over five points on one sample. Similar thicknesses were seen on other samples. The refractive index assumed, 1.5, is representative of the values measured ellipsometrically (1.48–1.59) on structures greater than 50 nm in thickness. The measured refractive index increased with increasing multilayer thickness.

The thickness of the multilayer film was seen to be remarkably even: ellipsometric measurements taken on any single hectorite-terminated sample typically agreed to within ±2%, and the majority of samples showed less than half that variability. Sample-to-sample reproducibility was also very good. Three samples prepared on different days with 22 cycles had average thicknesses within 2% of one another.

As an increasing number of layers was adsorbed, the samples progressed through a series of well-defined colors due to interference effects, as has been noted for LB and SA multilayer systems. No cloudiness was observed in the multilayer structures, and the colors were uniform, with only a small region (less than 1 mm wide) at the sample edges showing non-uniformity. Thus, as shown, the layers are of uniform thickness and regular growth, making such multilayer structures optically uniform.

It was expected that the hectorite would be adsorbed onto the sample in a controlled manner by ion exchange of the ammonium groups of the surface-bound polymer for the alkali metal counterions of the anionic hectorite sheets. Once the polymeric surface was covered with a layer of hectorite, further adsorption of the silicate was expected to be inhibited by Coulombic repulsion between anionic sheets. It was discovered, however, that approximately two layers of hectorite sheets (giving ellipsometric growth of 2.0–2.2 nm) could be adsorbed per cycle. Although we do not wish to be bound by this theory, this apparently is due to the fact that some of the polymer is associated sufficiently loosely at the surface that it is displaced in the subsequent hectorite adsorption and becomes the "glue" for addition of a second layer of hectorite. This is indicated in FIG. 2 by the polymer chain passing through the open space 18 in the hectorite layer between each two organic layers. Opening 18 represents the packing imperfection (i.e., open space at boundaries of the two sheets) in a single adsorbed layer of hectorite. Of advantage, however, this open space or defect may be covered over by the hectorite layer next absorbed, as shown in FIGS. 1, 2 of the drawing. It is believed this is due to the large lateral extent of the hectorite sheets. Thus, the multilayer structure maintains its structural order as is grows, in other words, adsorption of subsequent layers of hectorite provides "self healing" of the defect in the previously adsorbed hectorite layer. This is indicated, moreover, by the linearity of multilayer growth, later more fully disclosed.

It was discovered, quite advantageously, that the amount of hectorite adsorbed in a particular cycle could be controlled by varying the amounts of polymer adsorbed in that cycle. In this regard, the polymer solution was diluted in increments from 20% to 0.05% (w/w), and in response to this dilution the amount of polymer adsorbed per cycle was discovered to be decreased monotonically from about 2.1 to about 0.1 nm. The amount of hectorite adsorbed per cycle correspondingly fell from 2.7 to 0.6 nm.

Because the hectorite sheets in a single adsorbed layer will have packing imperfections (i.e., open space 18 at their boundaries), the linearity of multilayer growth shown in FIG. 4 indicates that this system is self-healing with respect to addition of subsequent layers. This is believed due to the rather large lateral extent of the sheets (~25–35 nm) which allows coverage of regions where the underlying layer is incomplete.

An alternative method for promoting adhesion of the first hectorite layer to the silicon wafer was via pretreatment of the oxide surface with N-trimethoxysilylpropyl-N,N,N-trimethylammonium chloride to form a covalently bonded monolayer capable of ion-exchange with the silicate. As expected, only a single layer of silicate (0.9 nm in thickness) adsorbed onto this surface.

Figure 5:
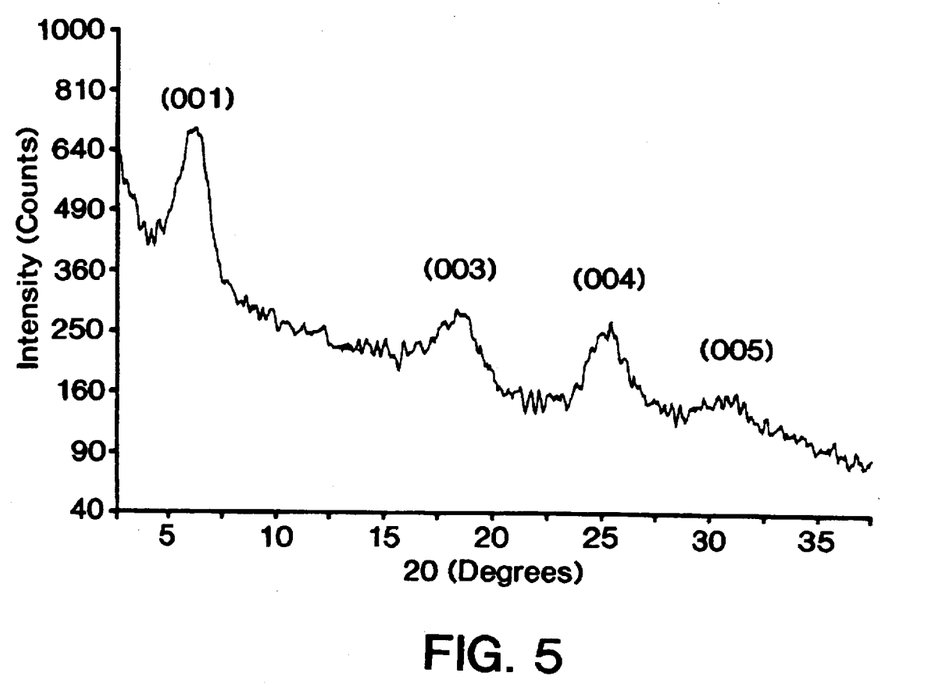
FIG. 5 is a graph showing an x-ray diffractogram of a multilayer structure of the invention with 60 adsorption cycles on silicon, the labeled peaks indicating a lattice spacing of about 1.4 nm.

Turning now to FIG. 5, it will be seen that x-ray diffraction (XRD) provided additional evidence for the presence of structural order in PDDA/hectorite multilayer structures according to the invention. The layers are seen by XRD to be ordered in the direction normal to the surface and XRD of the precursor mineral shows order within the silicate layer. FIG. 5 shows a grazing incidence XRD pattern of a multilayer structure formed by 60 adsorption cycles onto a silicon substrate. The peak at 6.1 degrees 2θ, a (001) reflection, corresponds to a layer spacing of 1.45±0.03 nm; (003), (004), and (005) reflections found at 18.4 degrees, 25.1 degrees, and 30.8 degrees indicate layer spacings of 1.44±0.02 nm, 1.42±0.02 nm, and 1.45±0.03 nm. These spacings are consistent with an ABABAB . . . alternation of the silicate sheets (0.96 nm thick) with polymer layers that are approximately 0.4–0.5 nm thick. These data were obtained on a Philips APD 3720 powder x-ray diffractometer using CuKα radiation.

The basal reflections indicate a lattice spacing of approximately 1.4 nm. The silicate lattices in adjacent layers are believed to lack atomic registry (H. S. Peiser, et al., Eds., *X-Ray Diffraction by Polycrystalline Materials*, (John Wright & Sons, Bristol, England, 1955, p. 466) causing an increase in the breadth of the (001) peak (full width at half height =1.6 degrees 2θ). V. A. Drits and C. Tchoubar, *X-Ray Diffraction by Disordered Lamellar Structures* (Springer-Verlag, New York, 1990), pp 21–22. Due to this extraneous source of broadening, application of the Scherrer equation (B. E. Warren, *X-Ray Diffraction*, Addison-Wesley, Reading, Mass. 1969, pp. 251–254) to the (001) reflection can only provide a lower limit (5.1 nm) to the size of ordered domains in the direction normal to the substrate surface. Additional peaks in the XRD pattern could be attributed to the substrate, as they also occurred in diffractograms of bare silicon wafers. The absence of reflections corresponding to the hectorite starting material indicates that no intact three-dimensional crystallites of the precursor have been incorporated into the structure, and is consistent with the sheets being preferentially oriented parallel or near-parallel to the substrate surface. The tendency of exfoliated silicate sheets to re-stack in a parallel arrangement has been well established.

Figure 6:
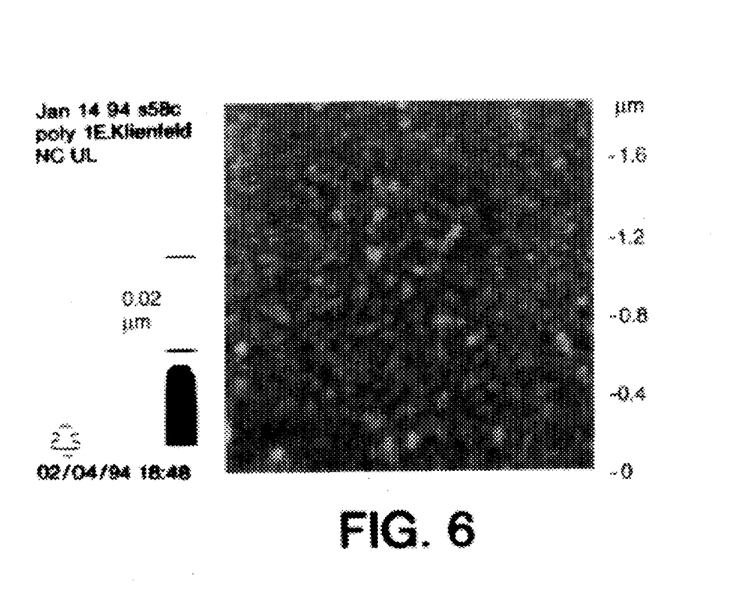
FIG. 6 is an AFM image, obtained in attractive mode, of a multilayer structure according to the invention comprising one adsorption cycle.

Atomic force microscopy (AFM) was used to examine the surface topography of multilayer structures of the invention. An AFM image of a 2 μm×2 μm area on a silicon wafer that had been treated with one PDDA/hectorite adsorption cycle is shown in FIG. 6. The AFM image, obtained in attractive ("non-contact") mode, reveals the individual hectorite sheets adsorbed at the sample surface. A sample that had been treated with five adsorption cycles gave a similar AFM image. An image of a clean silicon wafer was nearly flat by comparison. The AFM image was acquired using a Parks Scientific Instruments Autoprobe cp with an Ultralever (silicon) probe tip.

Figure 7:
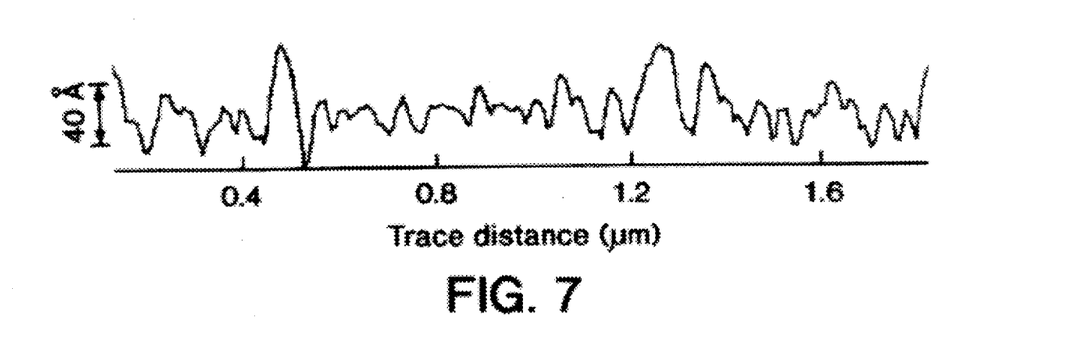
FIG. 7 is a trace showing a profile from the area shown in FIG. 6, taken horizontally approximately one-fourth of the way up from the bottom of the image, indicating the level of roughness of the surface of the film.

FIG. 7 shows a representative trace across the surface of the multilayered structure that was imaged, as earlier disclosed, and shown in FIG. 6, giving an idea of the lateral dimension of individual platelets and the level of roughness of the surface. The trace was taken horizontally, approximately one-fourth of the way up from the bottom of the AFM image taken.

EXAMPLE 2

Substrates were prepared by evaporation of a minimum of about 100 nm of gold, silver, or copper (99.99% or purer) onto silicon wafers, according to usual techniques. The wafers to be coated with gold were first treated with an adhesion promotor, 3-mercaptopropyltrimethoxysilane according to known techniques. Wafers to be treated with silver or copper were treated with dilute, aqueous hydrofluoric acid. The coated wafers were broken into pieces about 2 cm×about 1 cm.

Multilayer structures were obtained by the two-step adsorption process described in EXAMPLE 1. Multilayer elements having a thickness greater than about 0.15 μm were prepared on each metal-coated substrate.

X-ray photoelectron spectroscopy, as in EXAMPLE 1 (XPS, Scienta ESCA-300), of a sample formed by the adsorption of polymer, then silicate, then polymer onto a gold substrate revealed the presence of gold, carbon, nitrogen, chlorine, silicon, oxygen, and magnesium, i.e, those elements present in the component materials and substrate. Lithium was not detectable in the survey spectrum; its absence reflects its low concentration as well as the low sensitivity factor of the Li $1s_{1/2}$ orbital. This peak would be especially difficult to detect on this sample due to its overlap with the Au $5p_{3/2}$ peak. Sodium, which is present in Laponite as an interlamellar cation, did not appear in the spectrum, presumably because it had been exchanged for the catonic polymer.

Figure 8A:
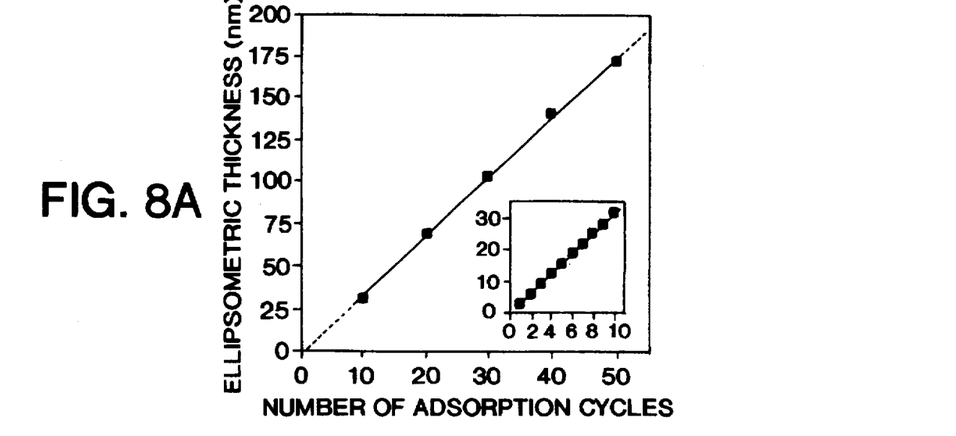
FIG. 8 shows the ellipsometric thickness of multilayer structure versus the number of adsorption cycles for substrates of gold, silver, and copper.
Figure 8B:
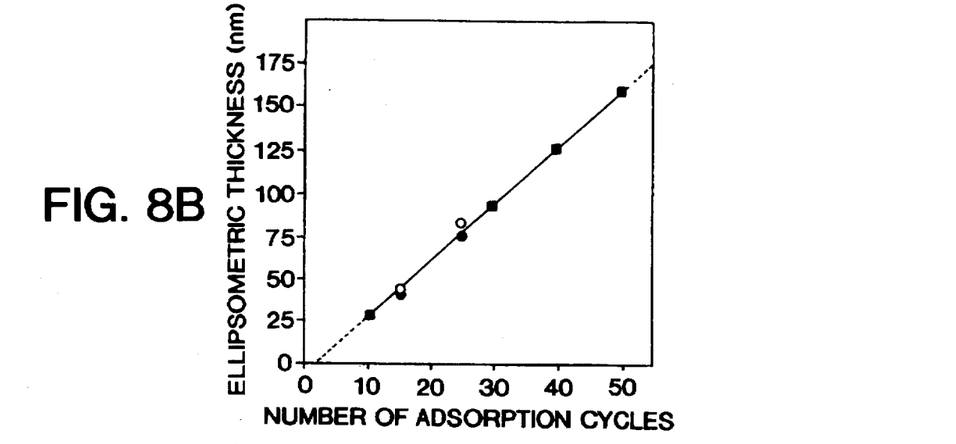
Figure 8C:
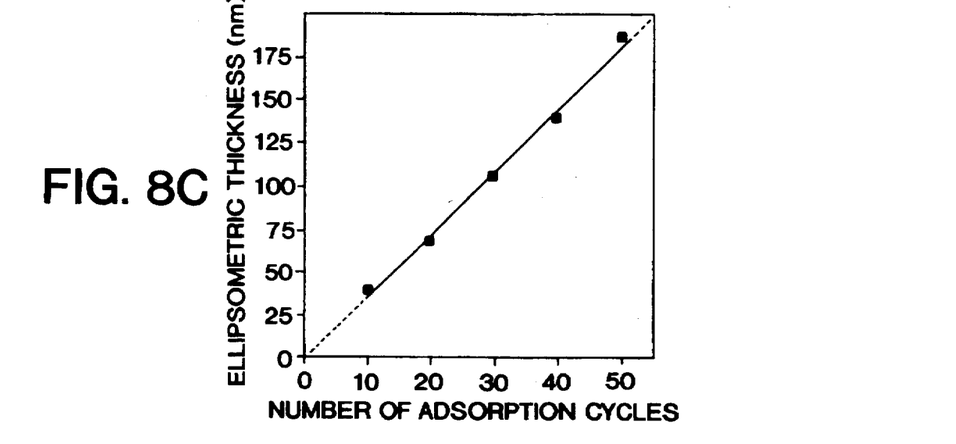

The thickness of the multilayer structures was determined ellipsometrically, as before disclosed, assuming a refractive index of 1.5 for all samples. FIG. 8 shows the growth in thickness of multilayers on gold, silver, and copper as a function of the number of adsorption cycles. In the first several adsorption cycles on gold, the multilayer structures grew an average of 3.2 nm per cycle (FIG. 8a inset), roughly 1.1 nm during the polymer-adsorption step and 2.1 nm during the silicate-adsorption step. This pattern of growth also characterized adsorptions onto silicon wafers and indicates that some of the polymer adsorbed in a given step can be displaced during the subsequent silicate adsorption to bind a second layer of hectorite, as disclosed in FIG. 2. The linear increase in film thickness with the number of cycles indicates that the adsorption process is regular: the large lateral extent of the hectorite sheets (roughly 25–35 nm) probably aids in coverage of defects (i.e., spaces at platelet edges) in the immediately underlying layer, thereby preserving structural order in the multilayer as new layers are added.

The slopes of the best-fit lines in FIG. 8 (10–50 cycles) are 3.6 nm/cycle on gold, 3.3 nm/cycle on silver, and 3.7 nm/cycle on copper, though these values were sensitive to the refractive index chosen. When the thicknesses were recalculated using the average refractive indices measured for multilayers on the different metals, the slopes were 3.3 nm/cycle on gold (n=1.55), 3.3 nm/cycle on silver (n=1.50), and 3.1 nm/cycle on copper (n=1.64).

The average thickness added per cycle on gold increased as the number of cycles increased (compare slopes in FIG. 8a and its inset). This variation may also be due to a change in refractive index; unfortunately, the refractive index could not be measured reliably for our thinnest samples using ellipsometry. Alternatively, the variation may be characteristic of the growth of this type of film, since a similar result was observed for films on silicon.

As multilayered structures were formed on gold and silver substrates, the samples had a uniform appearance, with no cloudiness or other sign of disorder in the adsorbed film. On copper, however, dark spots and streaks appeared within the first few cycles. These dark areas were found by dark-field optical microscopy to be rougher than the lighter areas on the treated copper, and much rougher than bare copper. We attribute this unevenness to the dissolution of copper under the conditions used to prepare the multilayers. In control experiments, thin layers of Cu foil (~100 nm ×1 cm×2 cm) dissolved completely in aqueous solutions of PDDA (5% w/w) in air, yielding a light blue precipitate of (mainly) CuCl. As additional cycles were performed on copper, however the flaws became less apparent.

Figure 9:
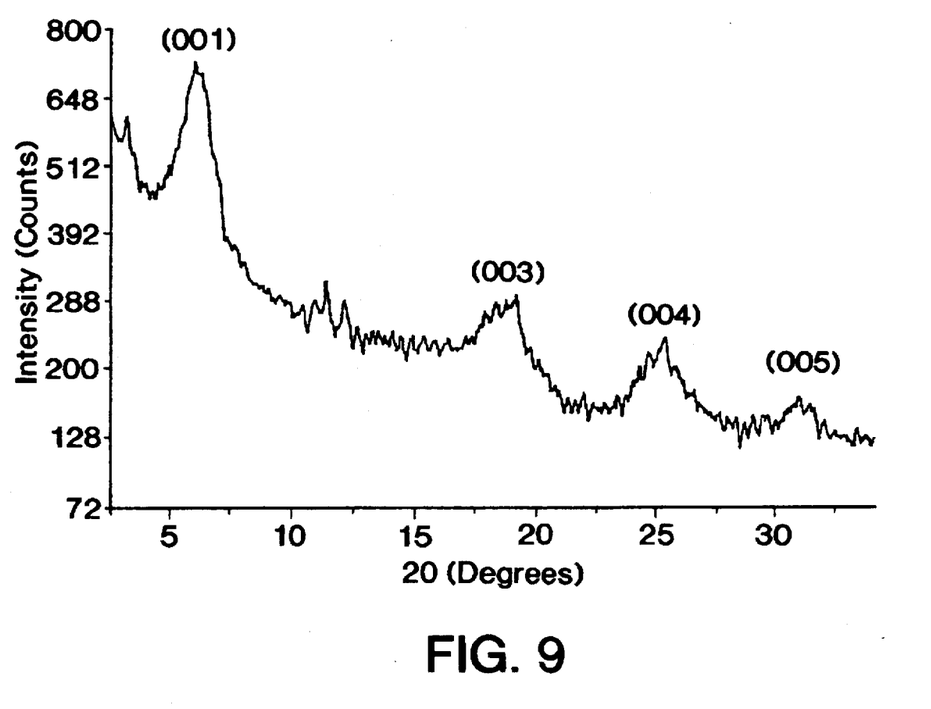
FIG. 9 is an x-ray diffraction pattern of a 50-cycle multilayer on gold, the labeled peaks indicating a lattice spacing of about 1.4 nm.

An X-ray diffraction pattern of a sample prepared by 50 adsorption cycles on gold is shown in FIG. 9 (Philips APD 3720 powder diffractometer). The (001) reflection at 6.0° indicates a lattice spacing of 1.46±0.03 nm; the (003), (004), and (005) reflections at 18.5°, 25.1°, and 31.0° indicate lattice spacings of 1.44, 1.42, and 1.44±0.02 nm. The approximately 3.6 nm of material adsorbed per cycle is not an even multiple of the 1.4 nm periodicity revealed by XRD. The ellipsometric value is an average thickness within a macroscopic illuminated spot (approx. 1 mm$^2$), and indicates that in any particular cycle, some areas gained two layers while others gained three. A weak feature sometimes occurred at approximately 12°2θ which is where a (002) reflection would be expected. Since this reflection was absent in diffractograms of similar structures on silicon, it is not surprising that it is weak here. The observed lattice spacing is consistent with the alternating ABAB arrangement of PDDA layers about 0.4 to about 0.5 nm in thickness and hectorite layers about 0.96 nm in thickness in the composite structure. The breadth of the (001) peaks results, in part, from the lack of atomic registry between hectorite sheets in adjacent layers, so analysis of the full widths at half maximum (FWHM) using the Scherrer equation gives only a lower limit to the crystallite dimension in the direction normal to the substrate surface. The FWHM of the (001) reflection is about 1.4°, corresponding to a crystallite size of about 6.0 nm.

An alternative method for promoting adhesion of the first hectorite layer to gold was via pretreatment of the gold surface with thiocholine chloride [HS(CH$_2$)$_2$NMe$_3$Cl] to form a covalently bonded monolayer capable of ion-exchange with the silicate. As expected, only a single layer of silicate (about 0.9 nm in thickness) adsorbed onto this treated surface. This result is similar to that observed for the adsorption of hectorite onto silicon substrates that had been treated with N-trimethoxysilylpropyl-N,N,N-trimethylammonium chloride.) As a control, the experiment was repeated using ethanethiol instead of thiocholine chloride. Surprisingly, treatment of this surface with hectorite also resulted in an increase in thickness (about 0.6 nm). Hectorite does not, however, adsorb onto bare gold.

Metallic top contacts (evaporated Au or Cu, or silver paint) were applied to PDDA/hectorite multilayers on gold for evaluation of the electrical properties of these structures. With applied voltages as low as 0.1 V, structures formed by 1–15 adsorption cycles were shod circuits, indicating that electrical conduction through the films can occur or that application of the top contacts damaged the structures, allowing direct metal-metal contact. Mercury drops were not suitable as top contacts, as they rapidly permeated the structures and amalgamated with the gold substrates.

The adsorptions on gold, silver, and copper substrates are rapid, result in the regular addition of about 3.6 nm of material per cycle, and have been used to produce multilayers of thicknesses greater than about 0.15 μm. X-ray diffraction revealed that films on gold are ordered, with a lattice spacing of about 1.4 nm. The extension from a semiconducting substrate (silicon) to conducting substrates significantly increases the versatility of this method for the preparation of multilayer structures and their application.

Although the invention has been specifically described with respect to cationic organic polyelectrolytes and anionic inorganic sheets, the charge in the multilayer structure may be inverted, if desired. Thus, multilayer structures comprising an anionic organic polyelectrolyte and a cationic inorganic sheet may, instead, be provided, according to the invention, if desired.

Those skilled in the art will readily appreciate that the method of forming the multilayer structures of the invention can be done on automated, continuous basis, if desired. Thus, the substrate 12, as disclosed in the above example, and which has been previously provided with a hydroxylated surface can be immersed first in a tank containing the organic solution. After the adsorption has reached the extent desired, the coated substrate is then rinsed with water and blown dry with nitrogen. Then, the substrate with the PDDA layer thereon is immersed in a tank containing the aqueous dispersion of hectorite. This layered structure, after adsorption has reached the extent desired, is then rinsed with water and blown dry with nitrogen. The procedure is repeated until a multilayered structure of the desired thickness is obtained.

It will be appreciated by those skilled in the art of multilayer technology that the method of building multilayer structures as disclosed herein can be readily adapted to other systems which not only incorporate other substrates but that also, for example, allow for other included molecules, and other inorganic sheets. The multilayer structures of the invention may also be found useful as substrates for growth of other materials. The multilayer structures, prepared under optimized conditions, may be, for example, metal-terminated whereby to provide a metal-insulator-semiconductor(MIS) or metal-insulator-metal (MIM) device or other devices of technological interest.

The invention has been specifically demonstrated herein with substrates having flat or smooth surfaces, or low surface area. Nevertheless, it will be appreciated by those skilled in the art that it is not so limited. The two step adsorption process of the invention is not only fast but allows also for preparation of multilayer elements of any thickness obtained in the manner disclosed herein. Thicknesses greater than about 2200 Angstroms have been obtained on silicon, and greater than about 1500 Angstroms on gold, silver, and copper.

Although the present invention has been described and illustrated in detail with respect to a preferred embodiment, it should be clearly understood that the same is by way of example and illustration only and is not to be taken by way of limitation, the spirit and scope of the present invention being limited only by the terms of the appended claims.

What we claim is:

1. A multilayer structure formed on a substrate comprising:
   (a) at least one layer of an organic ionic material having an overall negative or positive charge and being characterized by its ability to adsorb ionic material having ions of an opposite charge; and
   (b) at least one layer of an inorganic ionic material having ions of opposite charge to that of the layer of organic ionic material, said layer of inorganic ionic material characterized by its ability to adsorb ionic material of opposite charge whereby the two layers are held together by ion exchange reaction, said organic ionic material layer and said inorganic ionic material layer together exhibiting a characteristic lattice spacing.

2. A multilayer structure according to claim 1 wherein the organic ionic layer is disposed on the substrate, said substrate characterized by its ability to adsorb an ionic material.

3. A multilayer structure according to claim 2 wherein the substrate is a silicon wafer capable of adsorbing ionic material, the layer of organic ionic material is a cationic material, and the layer of inorganic material is an anionic material.

4. A multilayer structure according to claim 2 wherein the substrate comprises a gold layer.

5. A multilayer structure according to claim 2 wherein the substrate comprises a silver layer.

6. A multilayer structure according to claim 2 wherein the substrate comprises a copper layer.

7. A multilayer structure according to claim 3 wherein the at least one layer of organic ionic material and the at least one layer of inorganic ionic material each comprises both cations and anions, wherein one of the at least one organic ionic layers or the at least one inorganic ionic layers comprises cations in excess of anions, and the other layer comprises anions in excess of cations.

8. A multilayer structure according to claim 1 wherein the at least one layer of organic ionic material is an organic polymer.

9. A multilayer structure according to claim 8 wherein the organic polymer is a cationic polymer and the inorganic material is an anionic inorganic material.

10. A multilayer structure according to claim 9 wherein the cationic at least one organic polymer is polydiallyldimethylammonium chloride and the anionic inorganic material is silicate clay hectorite, said multilayered structure being characterized in that the layers are ordered in the direction normal to the surface of the substrate upon which the multilayer structure is formed.

11. A multilayered structure according to claim 1 wherein the lattice spacing is from about 1 to about 2 nanometers.

12. A multilayer structure having layers sufficiently ordered to diffract x-rays comprising:
   (a) a substrate characterized by the ability to adsorb a cationic organic material;
   (b) a layer of a cationic organic material adsorbed on the substrate; and
   (c) a layer of an inorganic material adsorbed by the layer of cationic organic material and bearing a negative charge so as to be capable of undergoing an ion exchange reaction with the cationic material.

13. A multilayer structure according to claim 12 wherein the structure comprises a plurality of alternating layers of cationic organic material and anionic inorganic material.

14. A multilayered structure according to claim 12, wherein said multilayered structure has a thickness greater than about 2200 Angstroms.

15. A multilayer structure according to claim 13 wherein each of said plurality of alternating layers is characterized by having about the same thickness.

16. A multilayer structure according to claim 13 wherein the substrate is characterized by a hydroxylated surface on which the cationic organic material is adsorbed.

17. A multilayer structure according to claim 16 wherein the substrate is a silicon wafer.

18. A multilayer structure according to claim 17 wherein the cationic organic layer is a polyelectrolyte.

19. A multilayer structure according to claim 18 wherein the polyelectrolyte is polydiallyldimethylammonium chloride.

20. A multilayer structure according to claim 19 wherein the anionic inorganic material is a silicate clay.

21. A multilayer structure according to claim 20 wherein the silicate clay is hectorite.

22. A multilayer structure formed on a substrate having the layer stacking sequence of ABCBABCBAB, where A and C are different organic cationic polyelectrolites and B is an anionic inorganic material, wherein layers of the multilayered structure exhibit lattice spacing.

* * * * *